United States Patent
Ozluturk

(10) Patent No.: US 9,345,025 B2
(45) Date of Patent: *May 17, 2016

(54) METHOD FOR USING A BASE STATION TO SELECTIVELY UTILIZE CHANNELS TO SUPPORT A PLURALITY OF COMMUNICATIONS

(71) Applicant: InterDigital Technology Corporation, Wilmington, DE (US)

(72) Inventor: Fatih M. Ozluturk, Sands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,034

(22) Filed: Apr. 27, 2015

(65) Prior Publication Data
US 2015/0230222 A1 Aug. 13, 2015

Related U.S. Application Data

(60) Continuation of application No. 14/087,959, filed on Nov. 22, 2013, now Pat. No. 9,019,940, which is a continuation of application No. 13/661,535, filed on Oct. 26, 2012, now Pat. No. 8,619,722, which is a (Continued)

(51) Int. Cl.
*H04B 7/216* (2006.01)
*H04W 72/04* (2009.01)
(Continued)

(52) U.S. Cl.
CPC ............. *H04W 72/044* (2013.01); *H04B 1/707* (2013.01); *H04J 3/16* (2013.01); *H04J 13/16* (2013.01); *H04L 5/0053* (2013.01); *H04Q 11/0435* (2013.01); *H04W 52/267* (2013.01); *H04W 72/0406* (2013.01); *H04W 72/0453* (2013.01);
(Continued)

(58) Field of Classification Search
USPC ......... 370/252, 254, 328, 329, 335, 341, 352, 370/455, 479, 450, 522, 524
See application file for complete search history.

(56) References Cited

U.S. PATENT DOCUMENTS 3,700,820 A 10/1972 Blasbalg et al.
3,761,610 A 9/1973 Krallinger et al.
(Continued)

FOREIGN PATENT DOCUMENTS

EP 0682423 11/1995
GB 2 305 085 3/1997
(Continued)

OTHER PUBLICATIONS

Azad et al., "Multirate Spread Spectrum Direct Sequence CDMA Techniques", IEE Colloquium on Spread Spectrum Techniques for Radio Communication Systems (Digest No. 95), Apr. 27, 1993, Apr. 15, 1994, pp. 4/1-4/05.

(Continued)

*Primary Examiner* — Mounir Moutaouakil
(74) *Attorney, Agent, or Firm* — Volpe and Koenig, P.C.

(57) ABSTRACT

A method for using a code division multiple access (CDMA) subscriber unit to transmit a communication to a base station at a first data rate using at least one communication channel, determine an adjusted data rate desired for support of the communication, and transmit the communication to the base station over a second channel at a second data rate, wherein the first data rate is different than the second data rate.

8 Claims, 12 Drawing Sheets

Related U.S. Application Data continuation of application No. 13/290,521, filed on Nov. 7, 2011, now Pat. No. 8,300,607, which is a continuation of application No. 12/048,911, filed on Mar. 14, 2008, now Pat. No. 8,054,916, which is a division of application No. 10/810,007, filed on Mar. 26, 2004, now Pat. No. 7,710,927, which is a continuation of application No. 10/080,835, filed on Feb. 22, 2002, now Pat. No. 6,798,759, which is a continuation of application No. 09/591,611, filed on Jun. 9, 2000, now Pat. No. 6,373,830, which is a continuation of application No. 08/898,537, filed on Jul. 22, 1997, now Pat. No. 6,075,792.

(60) Provisional application No. 60/049,637, filed on Jun. 16, 1997.

(51) Int. Cl.
| | | |
|---|---|---|
| *H04B 1/707* | (2011.01) | |
| *H04J 13/16* | (2011.01) | |
| *H04Q 11/04* | (2006.01) | |
| *H04W 84/14* | (2009.01) | |
| *H04L 5/00* | (2006.01) | |
| *H04J 3/16* | (2006.01) | |
| *H04W 52/26* | (2009.01) | |
| *H04W 24/00* | (2009.01) | |
| *H04W 28/22* | (2009.01) | |
| *H04W 36/06* | (2009.01) | |
| *H04W 76/02* | (2009.01) | |
| *H04W 76/06* | (2009.01) | |
| *H04W 88/08* | (2009.01) | |

(52) U.S. Cl.
CPC ..... *H04W 84/14* (2013.01); *H04B 2201/70703* (2013.01); *H04Q 2213/1307* (2013.01); *H04Q 2213/13098* (2013.01); *H04Q 2213/13174* (2013.01); *H04Q 2213/13204* (2013.01); *H04Q 2213/13208* (2013.01); *H04Q 2213/13209* (2013.01); *H04Q 2213/13294* (2013.01); *H04Q 2213/13332* (2013.01); *H04W 24/00* (2013.01); *H04W 28/22* (2013.01); *H04W 36/06* (2013.01); *H04W 76/02* (2013.01); *H04W 76/06* (2013.01); *H04W 88/08* (2013.01)

(56) References Cited

U.S. PATENT DOCUMENTS

| | | | |
|---|---|---|---|
| 4,069,392 A | | 1/1978 | Goldenberg et al. |
| 4,284,848 A | | 8/1981 | Frost |
| 5,056,109 A | * | 10/1991 | Gilhousen et al. ............ 370/342 |
| 5,095,530 A | | 3/1992 | Tanaka et al. |
| 5,103,459 A | * | 4/1992 | Gilhousen et al. ............ 370/206 |
| 5,239,678 A | | 8/1993 | Grube et al. |
| 5,373,502 A | | 12/1994 | Turban |
| 5,414,796 A | | 5/1995 | Jacobs et al. |
| 5,442,625 A | | 8/1995 | Gitlin et al. |
| 5,450,395 A | | 9/1995 | Hostetter et al. |
| 5,583,869 A | | 12/1996 | Grube et al. |
| 5,596,570 A | | 1/1997 | Soliman |
| 5,621,723 A | | 4/1997 | Walton, Jr. et al. |
| 5,642,348 A | | 6/1997 | Barzegar et al. |
| 5,648,962 A | | 7/1997 | Pirinen |
| 5,671,218 A | | 9/1997 | I et al. |
| 5,734,646 A | | 3/1998 | I et al. |
| 5,752,199 A | | 5/1998 | Scott |
| 5,761,196 A | | 6/1998 | Ayerst et al. |
| 5,774,460 A | * | 6/1998 | Schiffel et al. ............... 370/329 |
| 5,790,551 A | | 8/1998 | Chan |
| 5,805,585 A | | 9/1998 | Javitt et al. |
| 5,828,662 A | | 10/1998 | Jalali et al. |
| 5,856,971 A | | 1/1999 | Gitlin et al. |
| 5,859,840 A | | 1/1999 | Tiedemann et al. |
| 5,892,774 A | | 4/1999 | Zehavi et al. |
| 5,914,950 A | | 6/1999 | Tiedemann et al. |
| 5,923,650 A | | 7/1999 | Chen et al. |
| 5,926,500 A | * | 7/1999 | Odenwalder .......... H04B 7/264 370/208 |
| 5,926,755 A | * | 7/1999 | Ghisler ........................ 455/509 |
| 5,930,230 A | | 7/1999 | Odenwalder et al. |
| 5,940,452 A | | 8/1999 | Rich |
| 5,943,333 A | * | 8/1999 | Whinnett et al. ............. 370/345 |
| 6,005,855 A | | 12/1999 | Zehavi et al. |
| 6,064,678 A | | 5/2000 | Sindhushayana et al. |
| 6,069,883 A | | 5/2000 | Ejzak et al. |
| 6,072,787 A | * | 6/2000 | Hamalainen et al. ......... 370/335 |
| 6,073,021 A | * | 6/2000 | Kumar et al. ................. 455/442 |
| 6,075,792 A | | 6/2000 | Ozluturk |
| 6,081,536 A | | 6/2000 | Gorsuch et al. |
| 6,088,335 A | | 7/2000 | I et al. |
| 6,088,600 A | | 7/2000 | Rasmussen |
| 6,094,428 A | | 7/2000 | Bruckert et al. |
| 6,212,377 B1 | | 4/2001 | Dufour et al. |
| 6,222,832 B1 | | 4/2001 | Proctor |
| 6,269,088 B1 | | 7/2001 | Masui et al. |
| 6,272,151 B1 | * | 8/2001 | Gupta et al. ................. 370/489 |
| 6,373,830 B1 | | 4/2002 | Ozluturk |
| 6,377,809 B1 | | 4/2002 | Rezaiifar et al. |
| 6,389,000 B1 | | 5/2002 | Jou |
| 6,396,804 B2 | | 5/2002 | Odenwalder |
| 6,418,148 B1 | | 7/2002 | Kumar et al. |
| 6,574,211 B2 | | 6/2003 | Padovani et al. |
| 6,584,114 B1 | | 6/2003 | Flake et al. |
| 6,621,875 B2 | * | 9/2003 | Odenwalder .......... H04B 1/707 370/208 |
| 7,929,498 B2 | * | 4/2011 | Ozluturk et al. ............. 370/335 |
| 8,300,607 B2 | * | 10/2012 | Ozluturk ...................... 370/335 |
| 2007/0116209 A1 | | 5/2007 | Geile et al. |
| 2010/0208634 A1 | * | 8/2010 | Eng et al. ..................... 370/310 |

FOREIGN PATENT DOCUMENTS

| | | |
|---|---|---|
| JP | 01-132250 | 5/1989 |
| JP | 02-274131 | 11/1990 |
| JP | 04-090664 | 3/1992 |
| JP | 05-327580 | 12/1993 |
| JP | 08-195698 | 7/1996 |
| JP | 09-83600 | 3/1997 |
| KR | 1019920007375 | 4/1992 |
| KR | 1019950022342 | 8/1996 |
| KR | 1019970072741 | 11/1998 |
| WO | 92/00639 | 1/1992 |
| WO | 95/26094 | 9/1995 |
| WO | 97/02665 | 1/1997 |
| WO | 97/02714 | 1/1997 |
| WO | 97/07606 | 2/1997 |
| WO | 97/09810 | 3/1997 |
| WO | 97/21294 | 6/1997 |

OTHER PUBLICATIONS

Azad et al., "Multirate Spread Spectrum Direct Sequence CDMA Techniques", The Institution of Electrical Engineers, 1994, 4/1-4/5.
Black, "OSI: A Model for Computer Communications Standards," Chapters 3 and 4, Oct. 1990.
Budka et al., "Cellular Digital Packet Data Networks", Bell Labs Technical Journal, 1997, pp. 164-181.
Cellular Digital Packet Data, System Specification, Release 1.1, CDPD Forum, Jan. 19, 1995.
Data Service Option for Wideband Spread Spectrum Systems, TIA/EIA Interim Standard, TIA/EIA/IS-707, Feb. 1998.
Data Service Options for Wideband Spread Spectrum Systems: Introduction, PN-3676.1 (Content Revision), TR 45, Mar. 20, 1997.
Data Standard, Packet Data Section, Proposed PN-3679.5 (to be published as TIA/EIA/IS-Data.5), Version 02 (Content Revision 03), Dec. 8, 1996.

(56) References Cited

OTHER PUBLICATIONS

Draft Text for "*95C" Physical Layer (Revision 4), Part 1, Document #531-981-20814-95C, Part 1 on 3GPP2 website (ftp://ftp.3gpp2.org/TSGC/working/1998/1298_Maui/WG3-TG1/531-98120814-95C,%20part%201.pdf).

Draft Text for "95C" Physical Layer (Revision 4), Part 2, Document #531-981-20814-95C, part 2 on 3GGP2 website (ftp://ftp.3gpp2.org/TSGC/working/1998/1298_Maui/WG3-TG1/531-98120814-95c,%20part%202.pdf, 1998).

Ejzak et al., "Lucent Technologies Air Interface Proposal for CDMA High Speed Data Service, Revision 0.1", Telecommunications Industry Association, Subcommittee TR-45.5, Wideband Spread Spectrum Digital Technologies Standards, May 1997.

Ejzak et al., "Lucent Technologies Air Interface Proposal for CDMA High Speed Data Service," Apr. 14, 1997.

Hall et al., "Design and Analysis of Turbo Codes on Rayleigh Fading Channels", IEEE Journal on Selected Areas in Communications, vol. 16, No. 2, Feb. 1998, pp. 160-174.

High Data Rate (HDR), cdmaOne optimized for high speed, high capacity data, Wireless Infrastructure, Qualcomm, Sep. 1998.

Hindelang et al., "Using Powerful "Turbo" Codes for 14.4 KBIT/S Data Service in GSM or PCS Systems", IEEE Global Telecommunications Conference, Phoenix, Arizona, Nov. 3-8, vol. II, pp. 649-653.

I et al., "Load and Interference Based Demand Assignment (LIDA) for Integrated Services CDMA Wireless Systems", Proc. IEEE GLOBECOM '96, Nov. 1996, pp. 235-241.

I et al., "Multi-Code CDMA Wireless Personal Communications Networks", 1995 IEEE International Conference on Communications, Jun. 18, 1995, pp. 1060-1064.

I et al., "Performance of Multi-Code Cdma Wireless Personal Communications Networks", 1995 IEEE 45$^{th}$ Vehicular Technology Conference, vol. 2, Jul. 1995, pp. 907-911.

I et al., "Variable Spreading Gain CDMA with Adaptive Control for True Packet Switching Wireless Network", 1995 IEEE International Conference on Communications, vol. 2, Jun. 1995, pp. 725-730.

Kaiser et al., "Multi-Carrier CDMA with Iterative Decoding and Soft-Interference Cancellation", Global Telecommunications Conference, 1997, GLOBECOM97, IEEE, vol. 1, Nov. 1997, pp. 6-10.

Knisely, "Lucent Technologies Air Interface Proposal for CDMA High Speed Data Service", Telecommunications Industry Association, Subcommittee TR-45.5—Wideband Spread Spectrum Digital Technologies Standards, Working Group III—Physical Layer, Feb. 24, 1997.

Krzymien et al., "Rapid Acquisition Algorithms for Synchronization of Bursty Transmissions in CDMA Microcellular and Personal Wireless Systems", IEEE Journal on Selected Areas in Communications, vol. 14, Issue 3, Apr. 1996, pp. 570-579.

Kumar et al., "An Access Scheme for High Speed Packet Data Service on IS-95 Based CDMS", Bell Labs, Lucent Technologies, Feb. 11, 1997.

Liu et al., "Channel Access and Interference Issues in Multi-Code DS-CDMA Wireless Packet (ATM) Networks", ACM Baltzer Journal on Wireless Networks, 1996, pp. 173-193.

Lucent Presentation, "Phase 1C Service Definition", Apr. 1997, pp. 1-21.

Lucent Presentation, "Phase 1C Service Definition", Apr. 1997, pp. 1-18.

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Lucent Technologies Presentation, Feb. 21, 1997, pp. 1-24.

Mobile Station-Base Station Compatibility Standard for Dual-Mode Wideband Spread Spectrum Cellular System, TIA Interim Standard, TIA/EIA/IS-95-A, May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Packet Data Service Option Standard for Wideband Spread Spectrum Systems, TIA/EIA Interim Standard, TIA/EIA/IS-657, Jul. 1996.

Performance of High Data Rate (HDR) Solution, Qualcomm, Dec. 1998.

Reed et al., "Iterative Multiuser Detection for CDMA with FEC: Near-Single-User Performance, IEEE Transactions on Communications," vol. 46, No. 12, pp. 1693-1699, Dec. 1998.

*Tantivy Communications, Inc.v. Lucent Technologies, Inc.*, Markman Order, Civil Action No. 2:04-CV-79, Aug. 11, 1995.

Viterbi "The Path to Next Generation Services with CDMA," Qualcomm Incorporated, 1998 CDMA Americas Congress, Los Angeles, CA, Nov. 19, 1998.

Viterbi, A Constructive (Backward Compatible) Approach for Migration to Wider Band Wireless Services, Qualcomm Incorporated, 3$^{rd}$ Generation Wider Band CDMA Technology Conference, Atlanta, Georgia, Feb. 25, 1998.

Wang et al., "The Performance of Turbo-Codes in Asynchronous DS-CDMA", IEEE, Global Communications Conference, Phoenix, Arizona, USA, Nov. 3-8, 1997, vol. III, pp. 1548-1551.

Yang, "Network Wireless Systems Offer Business Unit (NWS OBU) Feature Definition Document for Code Division Multiple Access (CDMA) Packet Mode Data Services", CDMA Packet Mode Data Services, Nov. 26, 1996.

* cited by examiner

ISDN TERMINAL INTERFACE

POTS TERMINAL INTERFACE

PACKET TERMINAL

WIDEBAND CONNECTION

LEASED LINE TERMINAL INTERFACES

ISDN AND POTS NETWORK INTERFACE

WIDEBAND AND PACKET NETWORK INTERFACE

LEASED LINE NETWORK INTERFACE

METHOD FOR USING A BASE STATION TO SELECTIVELY UTILIZE CHANNELS TO SUPPORT A PLURALITY OF COMMUNICATIONS

CROSS REFERENCE TO RELATED APPLICATIONS

This application is a continuation of U.S. patent application Ser. No. 14/087,959, filed on Nov. 22, 2013, which is a continuation of U.S. patent application Ser. No. 13/661,535 filed on Oct. 26, 2012, which issued as U.S. Pat. No. 8,619,722 on Dec. 31, 2013, which is a continuation of U.S. patent application Ser. No. 13/290,521, filed Nov. 7, 2011, which issued as U.S. Pat. No. 8,300,607 on Oct. 30, 2012, which is a continuation of U.S. patent application Ser. No. 12/048,911 filed on Mar. 14, 2008, which issued as U.S. Pat. No. 8,054,916 on Nov. 8, 2011, which is a divisional of U.S. patent application Ser. No. 10/810,007, filed Mar. 26, 2004, which issued at U.S. Pat. No. 7,710,927 on May 4, 2010, which is a continuation of U.S. patent application Ser. No. 10/080,835 filed Feb. 22, 2002, which issued as U.S. Pat. No. 6,798,759 on Sep. 28, 2004, which is a continuation of U.S. patent application Ser. No. 09/591,611 filed Jun. 9, 2000, which issued as U.S. Pat. No. 6,373,830 on Apr. 16, 2002, which is a continuation of application Ser. No. 08/898,537, filed Jul. 22, 1997, which issued as U.S. Pat. No. 6,075,792 on Jun. 13, 2000, which claims the benefit of U.S. provisional application No. 60/049,637 filed on Jun. 16, 1997, the contents of which are hereby incorporated by reference herein.

FIELD OF INVENTION

This invention generally relates to wireless communication systems. More particularly, the invention relates to a wireless digital Code Division Multiple Access (CDMA) communication system including a base station and a plurality of subscriber units which selectively allocates bandwidth upon demand by a subscriber unit or an entity desiring to establish a communication with a subscriber unit.

BACKGROUND

The use of wireless technology by the telecommunication industry has increased dramatically as the capacity and reliability of wireless communication systems has improved. Once considered only to be a convenient method for sending voiced communications, digital wireless communications systems are now a necessity for providing transmission of all forms of communications including plain old telephony service (POTS), integrated services digital network (ISDN), variable bit rate (VBR) data service, wideband service, leased line service and packet data services. Although it has been technically feasible to transmit all of these types of services, the large amount of bandwidth required for high data rate communications has made many of these services uneconomical. As the number of subscribers requiring access to wireless digital communication systems has increased, the reliance on a wide bandwidth for each communication is no longer realistic.

The finite bandwidth allocated to wireless communications systems for public use has become increasingly valuable. Since it is unlikely that additional bandwidth to support user growth will be allocated for existing applications, many of the recent advances in telecommunication hardware and software have been directed toward increasing the transmission rate of data while utilizing a decreased amount of bandwidth.

Accordingly, there exists a need for a wireless digital communication system which supports the same high data rate services as conventional wired networks while utilizing the allocated bandwidth more efficiently.

SUMMARY

The present invention is a CDMA wireless digital communication system which supports all types of voice and data communications while utilizing the minimum amount of bandwidth for the particular application. The system efficiently allocates ISDN bandwidth on demand by a subscriber. Upon initialization of the subscriber unit, the system establishes a channel and generates the necessary spreading codes to support the highest capacity channel desired by the subscriber unit. However, the system does not set aside portions of the communication bandwidth until actually required by the subscriber unit. Since the call setup is performed at the beginning of any call from that particular subscriber unit, including the assignment of spreading codes, a subscriber unit can quickly gain access to the portion of the spectrum that is required to support the particular application.

Accordingly, it is an object of the invention to provide a wireless digital spread spectrum communication system which supports a range of telephone services including POTS and ISDN while efficiently utilizing the spread spectrum bandwidth.

Other objects and advantages of the present invention will become apparent after reading the description of a presently preferred embodiment.

DETAILED DESCRIPTION OF THE PREFERRED EMBODIMENTS

Figure 1:
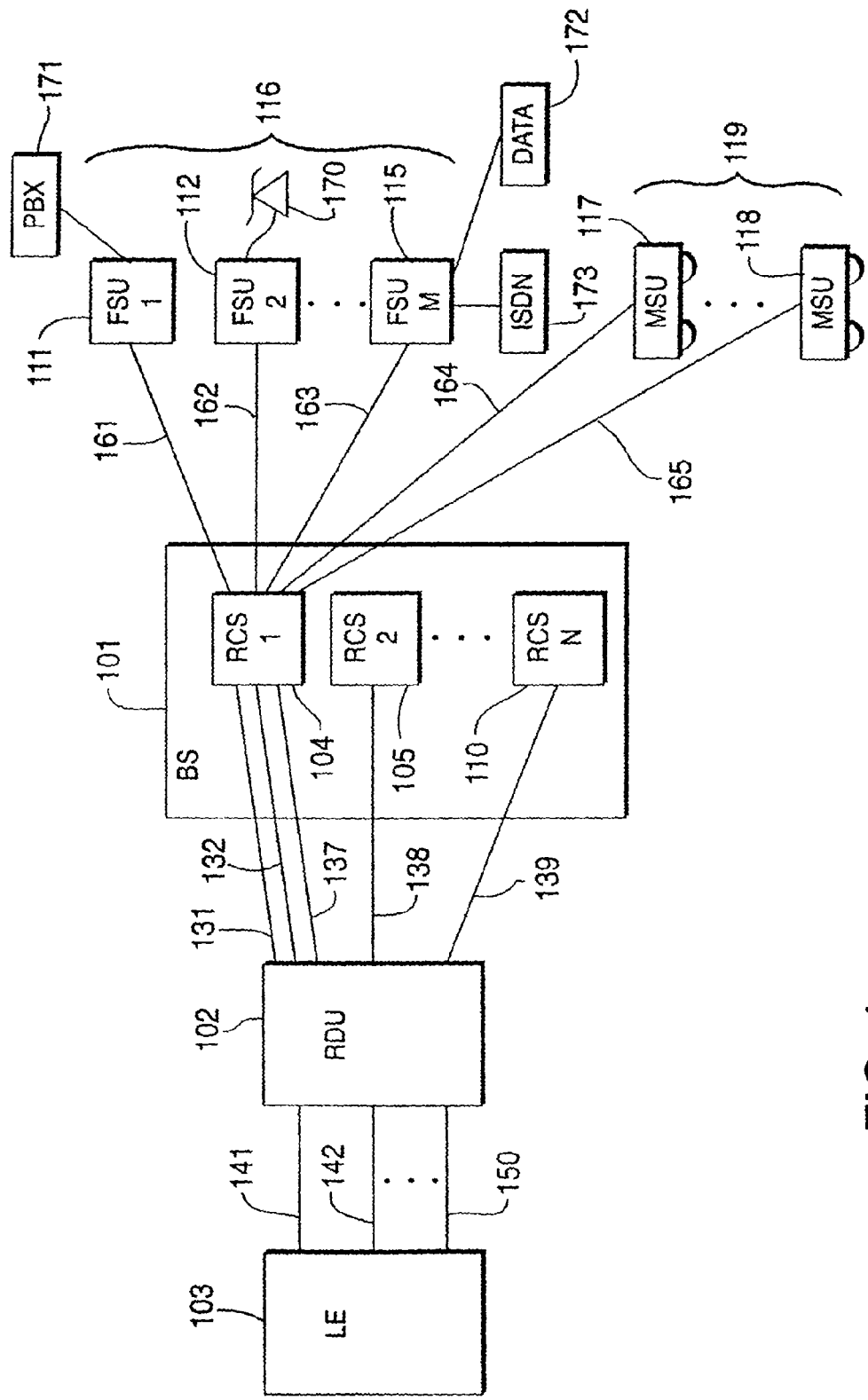
FIG. 1 is a block diagram of a code division multiple access spread spectrum communication system according to the present invention.
Figure 2A:
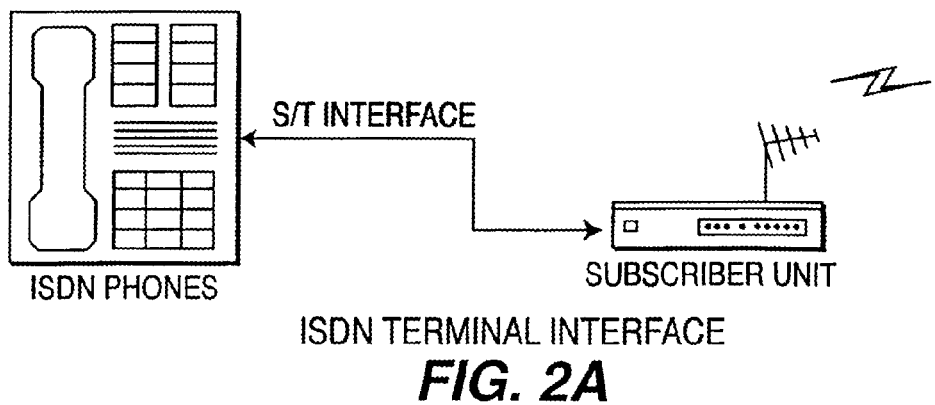
FIG. 2A is a block diagram of the interface between the subscriber unit of the present invention and an ISDN terminal.
Figure 2B:
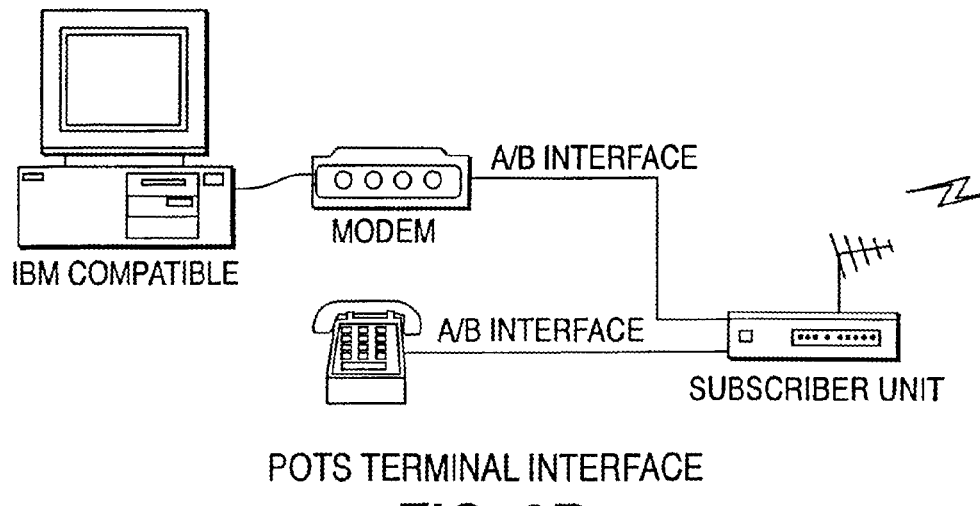
FIG. 2B is a block diagram of the interface between the subscriber unit of the present invention and a POTS terminal.
Figure 2C:
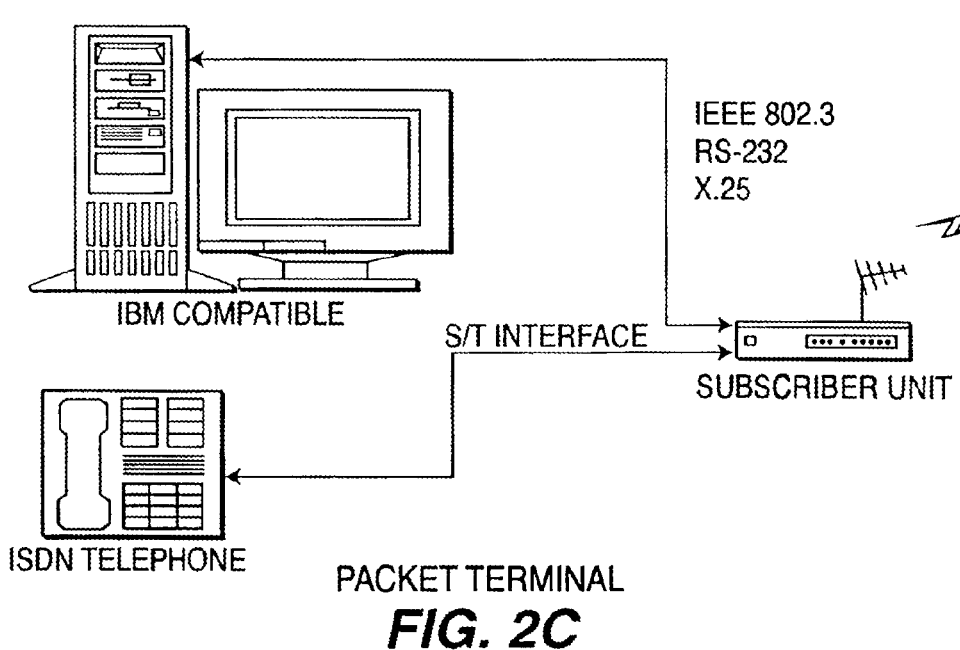
FIG. 2C is a block diagram of the interface between the subscriber unit of the present invention and a packet terminal.
Figure 2D:
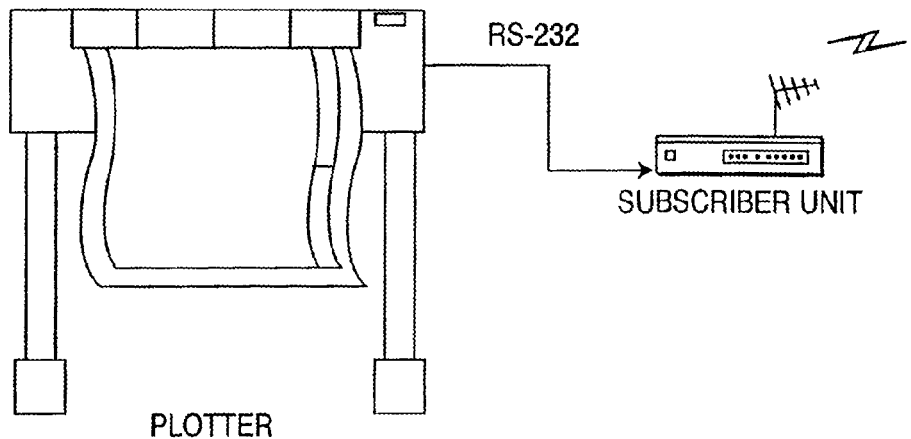
FIG. 2D is a block diagram of the interface between the subscriber unit of the present invention and a wideband connection.
Figure 2E:
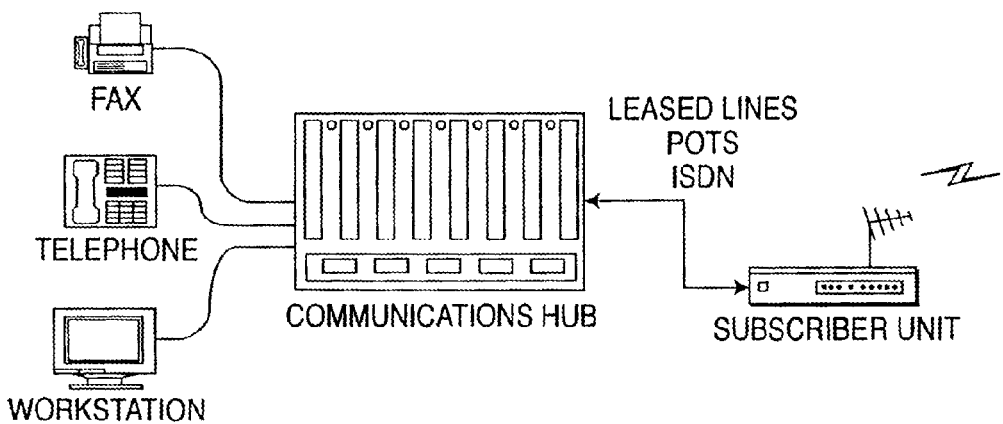
FIG. 2E is a block diagram of the interface between the subscriber unit of the present invention and a leased line terminal.
Figure 2F:
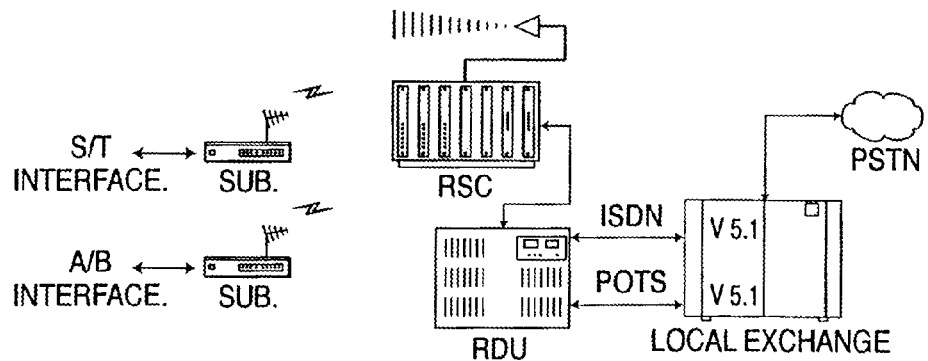
FIG. 2F is a block diagram of the interface between the subscriber unit of the present invention and an ISDN and POTS network.
Figure 2G:
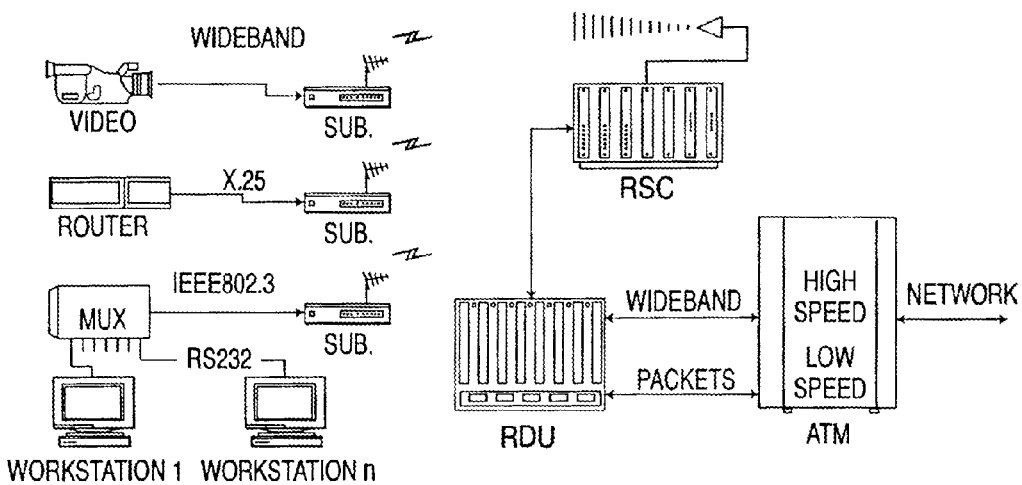
FIG. 2G is a block diagram of the interface between the subscriber unit of the present invention and a wideband and packet network.
Figure 2H:
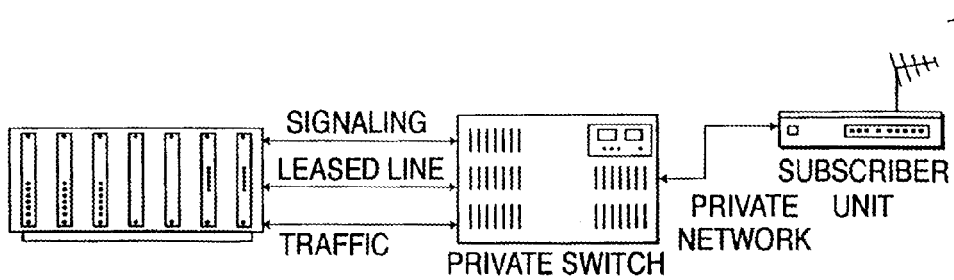
FIG. 2H is a block diagram of the interface between the subscriber unit of the present invention and a leased line network.

The preferred embodiment will be described with reference to the drawing figures wherein like numerals represent like elements throughout.

The system of the present invention provides local-loop telephone service using radio links between one or more base stations and at least one remote subscriber unit. In the exemplary embodiment, the radio link is described for a base station communicating with a fixed subscriber unit (FSU), but the system is equally applicable to systems including multiple base stations with radio links to both fixed subscriber units and mobile subscriber units (MSUs). Consequently, the fixed and mobile subscriber units will be referred to herein as subscriber units.

Referring to FIG. 1, a base station 101 provides call connection to a local exchange 103 or any other telephone network switching interface, such as a private branch exchange (PBX), and includes at least one radio carrier station (RCS) 104, 105 ... 110. One or more RCSs 104, 105, 110 connect to a radio distribution unit (RDU) 102 through links 131, 132, 137, 138, 139 and RDU 102 interfaces with the local exchange 103 by transmitting and receiving call set-up, control, and information signal through telco links 141, 142, 150. The subscriber units 116, 119 communicate with the RCS 104 through radio links 161, 162, 163, 164, 165. Alternatively, another embodiment of the invention includes several subscriber units and a "master subscriber unit" with functionality similar to the RCS 104. Such an embodiment may or may not have connection to a local telephone network.

The radio links 161 to 165 operate within the frequency bands of the CDS1800 standard (1.71-1.785 GHz and 1.805-1.880 GHz); the US-PCS standard (1.85-1.99 GHz); and the CEPT standard (2.0-2.7 GHz). Although these bands are used in the described embodiment, the invention is equally applicable to any RF frequency band including the entire UHF and SHF bands, and bands from 2.7 GHz to 5 GHz. The transmit and receive bandwidths are multiples of 3.5 MHz starting at 7 MHz, and multiples of 5 MHz starting at 10 MHz, respectively. The described system includes bandwidths of 7, 10, 10.5, 14 and 15 MHz. In the exemplary embodiment of the invention, the minimum guard band between the uplink and downlink is 20 MHz, and is desirably at least three times the signal bandwidth. The duplex separation is between 50 to 175 MHz, with the described invention using 50, 75, 80, 95 and 175 MHz. Other frequencies may also be used.

Although the system may use different spread-spectrum bandwidths centered around a carrier for the transmit and receive spread-spectrum channels, the present invention is readily extended to systems using multiple spread-spectrum bandwidths for the transmit channels and multiple spread-spectrum bandwidths for the receive channels. Alternatively, the same spread-spectrum bandwidth for both the transmit and receive channels may be employed wherein uplink and downlink transmissions will occupy the same frequency band. The present invention may also be readily extended to multiple CDMA frequency bands, each conveying a respectively different set of messages, uplink, downlink or uplink and downlink.

The spread binary symbol information is transmitted over the radio links 161 to 165 using quadrature phase shift keying (QPSK) modulation with Nyquist pulse shaping. However, other modulation techniques may be used including, but not limited to, offset QPSK minimum shift keying (MSK), Gaussian phase shift keying (GPSK) and M-ary phase shift keying (MPSK).

The radio links 161 to 165 incorporate broadband code division multiple access (B-CDMA™) technology as the mode of transmission in both the uplink and downlink directions. CDMA (also known as spread spectrum) communication techniques used in multiple access systems are well-known, and are described in U.S. Pat. No. 5,228,056 entitled SYNCHRONOUS SPREAD-SPECTRUM COMMUNICATION SYSTEM AND METHOD by Donald Schilling. The system described utilizes the direct sequence spreading technique. The CDMA modulator generates the spread-spectrum spreading code sequence, which can be a pseudonoise sequence, and performs complex direct sequence modulation of the QPSK signals with spreading code sequences for the In-phase (I) and Quadrature (Q) channels. Pilot signals, spreading codes which are not modulated by data, are generated and transmitted with the modulated signals. The pilot signals are used for synchronization, carrier phase recovery, and for estimating the impulse response of the radio channel. Each subscriber unit 111-118 includes a code generator and at least one CDMA modulator and demodulator, which together comprise a CDMA modem. Each RCS 104, 105, 110 has at least one code generator plus sufficient CDMA modulators and demodulators for all of the logical channels in use by the subscriber units.

The CDMA demodulator despreads the signal with appropriate processing to reduce or exploit multipath propagation effects. The radio links support multiple traffic channels with data rates of 8, 16, 32, 64, 128 and 144 kb/s. The physical channel to which a traffic channel is connected operates with a 64 k symbol/sec rate. Other data rates may be supported, and forward error correction (FEC) coding can be employed. For the described embodiment, FEC with a coding rate of ½ and a constraint length 7 is used. Other rates and constraint lengths can be used consistent with the code generation techniques employed.

Referring again to FIG. 1, the RCS 104 interfaces to the RDU 102 through a plurality of RF links or terrestrial links 131, 132, 137 with, for example, 1.533 Mb/s DS1, 2.048 Mbs/E1; or HDSL formats to receive and send digital data signals. While these are typical telephone company standardized interfaces, the present invention is not limited to these digital data formats only. The exemplary RCS line interface (not shown in FIG. 1) translates the line coding (such as HDB3, B8ZS, AMI) and extracts or produces framing information, performs alarms and facility signaling functions, as well as channel specific loop-back and parity check functions. This provides 64 kb/s PCM encoded or 32 kb/s ADPCM encoded telephone traffic channels or ISDN channels to the RCS 104, 105, 110 for processing as will be described in greater detail hereinafter. Other voice compression techniques can be used consistent with the sequence generation techniques.

The system of the present invention also supports bearer rate modification between the RCS 104 and the subscriber unit 111 for both POTS service and ISDN service. The subscriber units 111-118 may interface with a telephone unit 170, a local switch (PBX) 171, a data terminal 172, an ISDN interface 173 or other types of equipment shown in FIGS. 2A-2H. The input from the telephone unit 170 may include voice, voiceband data and signaling. Although the present invention is applicable to the communications between a plurality of subscriber units 111-118 and a plurality of RCSs 104-110, reference hereinafter will be made to a particular subscriber unit and RCS for simplicity. If the signals input into the subscriber unit are not digital, the subscriber unit 111 translates the analog signals into digital sequences for transmission to the RCS 104. The subscriber unit 112 encodes voice data with techniques such as ADPCM at rates of 32 kb/s or lower. The RCS 104 detects voiceband data or facsimile data with rates above 4.8 kb/s to modify the bearer rate of the traffic channel for unencoded transmission. Also A-law, u-law, or no companding of the signal may be performed before transmission. As is well known to those of skill in the art, data compression techniques for digital data such as idle flag removal may also be used to conserve capacity and minimize interference.

The system of the present invention also supports bearer rate modification between the RCS 104 and the subscriber unit 111 for both POTS service and ISDN service. The subscriber units 111-118 may interface with a telephone unit 170, a local switch (PBX) 171, a data terminal 172, an ISDN interface 173 or other types of equipment shown in FIGS. 2A-2H. The input from the telephone unit 170 may include voice, voiceband data and signaling. Although the present invention is applicable to the communications between a plurality of subscriber units 111-118 and a plurality of RCSs 104-110, reference hereinafter will be made to a particular subscriber unit and RCS for simplicity. If the signals input into the subscriber unit are not digital, the subscriber unit 111 translates the analog signals into digital sequences for transmission to the RCS 104. The subscriber unit 112 encodes voice data with techniques such as ADPCM at rates of 32 kb/s or lower. The RCS 104 detects voiceband data or facsimile data with rates above 4.8 kb/s to modify the bearer rate of the traffic channel for unencoded transmission. Also A-law, u-law, or no companding of the signal may be performed before transmission. As is well known to those of skill in the art, data compression techniques for digital data such as idle flag removal may also be used to conserve capacity and minimize interference.

The transmit power level of the radio interface between the RCS 104 and the subscriber unit 111 is controlled using a different closed loop power control method for the downlink and uplink directions. The automatic forward power control (AFPC) method determines the downlink transmit power level and the automatic reverse power control (ARPC) method determines the uplink transmit power level. The logical control channel by which the subscriber unit 111 and the RCS 104 transfer power control information operates at an update rate of at least a 16 kHz. Other embodiments may use a faster or slower update rate, for example 64 kHz. These algorithms ensure that the transmit power of a user maintains an acceptable bit-error rate (BER), maintain the system power at a minimum to conserve power and maintain the power level of the subscriber unit 111 as received by the RCS 104 at a nearly equal level.

The system also uses an optional maintenance power control method during the inactive mode of the subscriber unit 111. When the subscriber unit 111 is inactive or powered-down to conserve power, the subscriber unit 111 occasionally activates to adjust its initial transmit power level setting in response to a maintenance power control signal from the RCS 104. The maintenance power control signal is determined by the RCS 104 by measuring the received power level of the subscriber unit 111 and present system power level and calculating the necessary initial transmit power. The method shortens the channel acquisition time of the subscriber unit 111 to begin a communication and prevents the transmit power level of the subscriber unit 111 from becoming too high and interfering with other channels during the initial transmission before the closed loop power control reduces the transmit power.

The RCS 104 obtains synchronization of its clock from an interface line such as, but not limited to, E1, T1, or HDSL interfaces. The RCS 104 can also generate its own internal clock signal from an oscillator which may be regulated by a global positioning system (GPS) receiver. The RCS 104 generates a global pilot code, which can be acquired by the remote subscriber unit 111. All transmission channels of the RCS 104 are synchronized to the global pilot channel. The spreading code phases of code generators (not shown in FIG. 1) used for logical communication channels within the RCS 104 are also synchronized to the spreading code phase of the global pilot channel. Similarly, all subscriber units 111-118 which receive the global pilot code of the RCS 104 synchronize the spreading and de-spreading code phases of their code generators to the global pilot code.

Typically, a prior art channel is regarded as a communications path which is part of an interface and which can be distinguished from other paths of that interface without regard to its content. However, for CDMA communications, separate communications paths are distinguished by their content. All logical channels and subchannels of the present invention are mapped to a common 64 kilo-symbols per second (ksym/s) QPSK stream. Some channels are synchronized to associated pilot codes which are generated from, and perform a similar function to, the global pilot code. The system pilot signals are not considered logical channels.

Several logical communication channels are used over the RF communication link between the RCS 104 and the subscriber unit 111. Each logical communication channel either has a fixed, pre-determined spreading code or a dynamically assigned spreading code. For both predetermined and assigned codes, the code phase is synchronized with the global pilot code.

The spreading codes are specified by the seeds used to generate the codes. A pool of "primary seeds" exists within the RDU 102, a portion of which comprise global primary seeds and the remainder comprise assigned primary seeds. The RDU 102 allocates these primary seeds to the RCSs 104 on an as-needed basis. A global primary seed generates all of the global channel codes for use by an RCS 104 within a cell. However, assigned primary seeds are used to generate secondary assigned seeds. One primary assigned seed generates fifty-seven (57) secondary assigned seeds. Each secondary assigned seed is input into the code generators within the RCS 104 and the subscriber unit 111 to generate a set of assigned channel codes to support each communication link. In the preferred embodiment, each RCS 104 is given one global primary seed for generating global channel codes and two primary assigned seeds. Accordingly, the RCS 104 and its corresponding subscriber units 111-118 may generate up to 114 secondary assigned seeds. Each secondary assigned seed is assigned by the RCS 104 to generate the codes for an active link, thereby permitting enough codes for up to 114 simultaneous communication links.

Logical communication channels are divided into two groups: 1) global channels; and 2) assigned channels. The global channel group includes channels which are either transmitted from the RCS 104 to all subscriber units 111-118 or from any subscriber unit 111-118 to the RCS 104 regardless of the identity of the subscriber unit 111-118. Channels in the assigned channels group are those channels dedicated to communication between the RCS 104 and a particular subscriber unit 111.

With respect to the global channel group, the global channel group provides for: 1) broadcast control logical channels, which provide point-to-multi-point services for broadcasting messages to all subscriber units 111-118 and paging messages to subscriber units 111-118; and 2) access control logical channels which provide point-to-point services on global channels for subscriber units 111-118 to access the system and obtain assigned channels. The RCS 104 of the present invention has one broadcast control logical channel and multiple access control logical channels. A subscriber unit 111-118 of the present invention has at least one broadcast control logical channel and at least one access control logical channel.

The global logical channels controlled by the RCS 104 are the fast broadcast channel (FBCCH) which broadcasts fast changing information concerning which services and which access channels are currently available, and the slow broadcast channel (SBCCH) which broadcasts slow changing system information and paging messages.

The subscriber unit 111 uses an access channel (AXCH) to begin communications with the RCS 104 and gain access to assigned channels. Each AXCH is paired with a control channel (CTCH) which is sent from the RCS 104 to the subscriber unit 111. The CTCH is used by the RCS 104 to acknowledge and reply to access attempts by the subscriber unit 111. The short access pilot (SAXPT) and the long access pilot (LAXPT) are transmitted synchronously with AXCH to initiate access and to provide the RCS 104 with a time and phase reference. The SAXPT is transmitted by the subscriber unit 111 while it ramps up its transmit power to initiate access to the RCS 104. Since the SAXPT is a relatively short code it permits the RCS 104 to detect the subscriber unit 111 quickly and avoids power overshoot by the subscriber unit 111. Further detail regarding transmit power ramp-up using the SAXPT is described in more detail in an application entitled A METHOD OF CONTROLLING INITIAL POWER RAMP-UP IN CDMA SYSTEMS BY USING SHORT CODES, Ser. No. 08/670,162; filed Jun. 27, 1996 which is herein incorporated by reference as if fully set forth. Until the SAXPT is detected by the RCS 104, subscriber unit 111 does not send any other signal. Once the SAXPT is detected, the subscriber unit 111 starts transmitting the LAXPT which provides the RCS 104 with a time and phase reference and permits the RCS 104 to determine the channel impulse response.

With respect to the assigned channel group, this group contains the logical channels that control a single communication link between the RCS 104 and the subscriber unit 111. When an assigned channel group is formed, a pair of power control logical message channels for each of the uplink and downlink connections is established and one or more pairs of traffic channels, depending on the type of connection, is established. The bearer control function performs the required forward error control, bearer rate modification and encryption functions.

Each subscriber unit 111-118 has at least one assigned channel group when a communication link is established, and each RCS 104-110 has multiple assigned channel groups, one for each communication link in progress. An assigned channel group of logical channels is created for a communication link upon successful establishment of the communication link. The assigned channel group includes encryption, FEC coding, and multiplexing on transmission, and decryption, FEC decoding and demultiplexing on reception.

Each assigned channel group provides a set of communication link oriented point-to-point services and operates in both directions between a specific RCS 104 and a specific subscriber unit 111. An assigned channel group formed for a communication link can control more than one bearer over the RF communication channel associated with a single communication link. Multiple bearers are used to carry distributed data such as, but not limited to, ISDN. An assigned channel group can provide for the duplication of traffic channels to facilitate switchover to 64 kb/s PCM for high speed facsimile and modem services for the bearer rate modification function.

The assigned logical channels formed upon a successful communication link and included in the assigned channel group are dedicated signaling channel order wire (OW), APC channel and one or more traffic channels (TRCH) which are bearers of 8, 16, 32, or 64 kb/s depending on the service supported. For voice traffic, moderate rate coded speech ADPCM or PCM can be supported on the traffic channels. For ISDN service types, two 64 kb/s TRCHs form the B channels and one 16 kb/s TRCH forms the D channel. Alternatively, the APC subchannel may either be separately modulated on its own CDMA channel, or may be time division multiplexed with a traffic channel or OW channel.

Each subscriber unit 111-118 of the present invention supports up to three simultaneous traffic channels. A subscriber unit is preferably commissioned to be a POTS subscriber unit 112 or an ISDN subscriber unit 115. Although POTS subscriber unit 112 does not support ISDN service in accordance with the present invention, bandwidth resources can be dynamically allocated for either service type. For example, a POTS subscriber unit 112 can set up an additional POTS line and tear it down, or an ISDN subscriber unit 115 can dynamically add B channel-carrying bearers or tear them down. For dynamic bandwidth allocation of a POTS service, an active 32 kb/s ADPCM service modifies the bearer type from 32 kb/s to 64 kb/s unencoded data to support facsimile transmission. The presence of a facsimile call is determined by the RCS 104 by monitoring the existence of the 2100 Hz answer tone.

For dynamic bandwidth allocation of ISDN service, the RCS 104 monitors the ISDN D channel messages to determine when a B channel is requested and when it should be torn down. Once the RCS 104 determines the need for changing the bearer channel allocation, the RCS 104 initiates the dynamic bearer allocation procedure which will be described in greater detail hereinafter. The mapping of the three logical channels for TRCHs to the user data is shown below in Table 1:

TABLE 1

Mapping of service types to the three available TRCH channels

| Service | TRCH(0) | TRCH(1) | TRCH(2) |
|---|---|---|---|
| 16 kb/s POTS | TRCH/16 | not used | not used |
| 32 + 64 kb/s POTS(during BCM) | TRCH/32 | TRCH/64 | not used |
| 32 kb/s POTS | TRCH/32 | not used | not used |
| 64 kb/s POTS | not used | TRCH/64 | not used |
| ISDN D | not used | not used | TRCH/16 |
| Digital LL @64 kb/s | TRCH/64 | not used | not used |
| Digital LL @ 2 × 64 kb/s | TRCH/64 | TRCH/64 | not used |
| Analog LL @ 64 kb/s | TRCH/64 | not used | not used |

Figure 3:
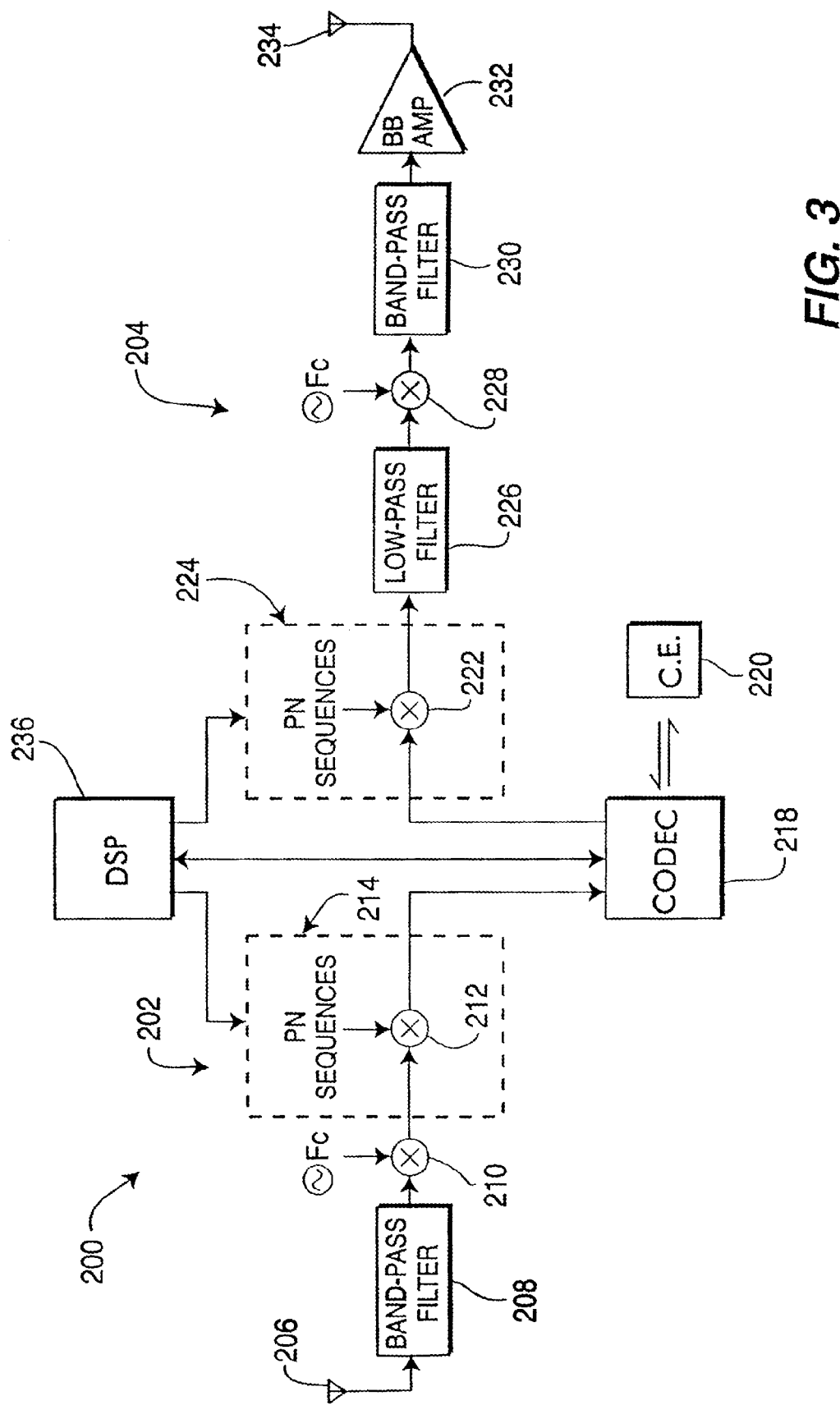
FIG. 3 is a block diagram of a subscriber unit in accordance with the present invention.

A subscriber unit 200 made in accordance with the present invention is generally shown in FIG. 3. The subscriber unit 200 includes a receiver section 202 and a transmitter section 204. An antenna 206 receives a signal from RCS 104, which is filtered by a band-pass filter 208 having a bandwidth equal to twice the chip rate and a center frequency equal to the center frequency of the spread spectrum system's bandwidth. The output of the filter 208 is down-converted by a mixer 210 to a baseband signal using a constant frequency (Fc) local oscillator. The output of the mixer 210 is then spread spectrum decoded by applying a PN sequence for each logical channel to a mixer 212 within the PN Rx generator 214. The output of the mixer 212 is input to a codec 218 which interfaces with the communicating entity 220.

A baseband signal from the communicating entity 220, for example the equipment shown in FIGS. 2A-2H, is pulse code modulated by the codec 218. Preferably, a 32 kb/s adaptive pulse code modulation (ADPCM) is used. The PCM signal is applied to a mixer 222 within a PN Tx generator 224. The mixer 222 multiplies the PCM data signal with the PN sequence for each logical channel. The output of the mixer 222 is applied to low-pass filter 226 whose cutoff frequency is equal to the system chip rate. The output of the filter 226 is then applied to a mixer 228 and suitably up-converted, as determined by the carrier frequency Fc applied to the other terminal. The up-converted signal is then passed through a band-pass filter 230 and to a broadband RF amplifier 232 which drives an antenna 234. Although two antennas 206, 234 are shown, the preferred embodiment includes a diplexer and a single antenna for transmission and reception. The digital signal processor (DSP) 236 controls the acquisition process as well as the Rx and Tx PN generators 214, 224.

Figure 4:
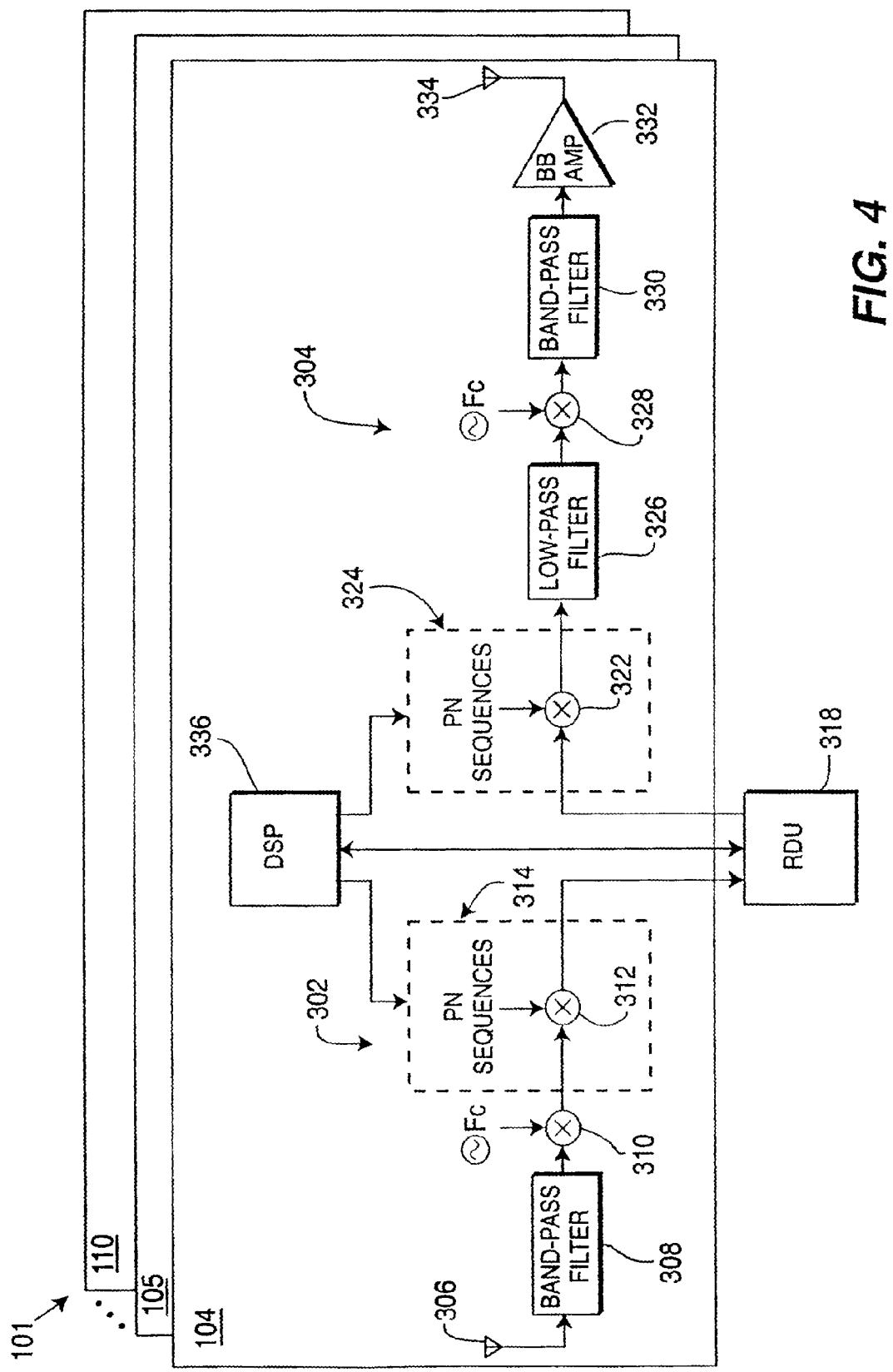
FIG. 4 is a block diagram of an RCS in accordance with the present invention.

The base station 101, which includes a plurality of RCSs 104, 105, 110 made in accordance with the present invention is shown in FIG. 4. For simplicity, only one RCS 104 is shown. The base station 101 includes a receiver section 302 and a transmitter section 304. An antenna 306 receives a signal from the subscriber unit, which is filtered by a band-pass filter 308 having a bandwidth equal to twice the chip rate and a center frequency equal to the center frequency of the spread spectrum system's bandwidth. The output of the filter 308 is down-converted by a mixer 310 to a baseband signal using a constant frequency (Fc) local oscillator. The output of the mixer 310 is then spread spectrum decoded at each modem by applying a PN sequence to a mixer 312 within the PN Rx generator 314. The output of the mixer 316 is then forwarded to the RDU 318.

A baseband signal is received from the RDU 318. Preferably, a 32 kb/s ADPCM signal is used. The ADPCM or PCM signal is applied to a mixer 322 within a PN Tx generator 324. The mixer 322 multiplies the ADPCM or PCM data signal with the PN sequence. The output of the mixer 322 is applied to low-pass filter 326 whose cutoff frequency is equal to the system chip rate. The output of the filter 326 is then applied to a mixer 328 and suitably up-converted, as determined by the carrier frequency Fc applied to the other terminal. The up-converted signal is then passed through a band-pass filter 330 and to a broadband RF amplifier 332 which drives an antenna 334. Although two antennas 306, 334 are shown, the preferred embodiment includes a diplexer and only one antenna for transmission and reception. The digital signal processor (DSP) 336 controls the acquisition process as well as the Rx and Tx PN generators 314, 324.

The system provides a wireless link between the RCS 104 and the plurality of subscriber units 111-118. In order to conserve as much bandwidth as possible, the system selectively allots the bandwidth required for supporting the data transmission rate required by particular communication. In this manner, the system ensures that the bandwidth is utilized efficiently. For example, referring back to Table 1, voiced communications may be effectively transmitted across a 32 kb/s adaptive pulse code modulation (ADPCM) channel. However, a high speed facsimile or data modem signal requires at least a 64 k/bs PCM signal to reliably transmit the communication. Additionally, although a subscriber unit 115 has paid for ISDN service, which includes two 64 kb/s B channels and one 16 kb/s channel, the entire ISDN capacity is rarely utilized at all times. Many different data transmission rates may also be utilized by originating and terminating nodes.

The originating and terminating nodes may comprise computers, facsimile machines, automatic calling and answering equipment, data networks or any combination of this equipment. For robust communication of data it is imperative to ensure that the communication system switches to the data transmission rate required by the communicating nodes prior to the transmission of any data. The system must be able to effectively allocate bandwidth and dynamically switch between these data communication rates on demand by the user. Modification of the transmission rate from a low rate (that supports voice communication) to a high rate (that supports encoded data communication) ensures that data will be reliably and quickly transmitted over a communication channel. Additionally, if an ISDN D channel is presently allocated and one or two B channels are required, the system must ensure that the code generators are activated in order to support the communication.

For POTS, there are two basic scenarios where the bearer channel (TRCH channel) is either modified or a new bearer channel is added or torn down. First, the bearer channel is modified from 32 kb/s coded ADPCM type to 64 kb/s uncoded PCM service to support a facsimile transmission. Second, a new bearer channel is added or torn down when the subscriber goes off hook while an OA&M (overhead, administration and maintenance) call is in progress, or when an OA&M call is initiated while a POTS call is in progress. While an OA&M silent call is in progress, the subscriber unit 112 can determine that the user is initiating a new POTS call by monitoring the changes at the A/B interface between the subscriber unit 112 and the communication equipment 170 (on-hook/off-hook sensor). More detail regarding the dynamic allocation of bandwidth for POTS may be found in an application entitled CODE DIVISION MULTIPLE ACCESS (CDMA) COMMUNICATION SYSTEM, patent application Ser. No. Not Yet Known, filed Mar. 11, 1997, which is a continuation-in-part of Ser. No. 08/669,775, filed Jun. 27, 1996 by Lomp et al., which is incorporated herein by reference as if fully set forth.

For ISDN service, the dynamic bandwidth allocation refers to selective allocation of the D and B channels in a D, D and B, or D and 2B bearer channel configuration as needed and tearing them down when they are idle. The ISDN D channel carries control messaging and cannot be torn down while the ISDN call is still active. Accordingly, dynamic bandwidth allocation for ISDN service only relates to the addition and tearing down of B channels.

Figure 5:
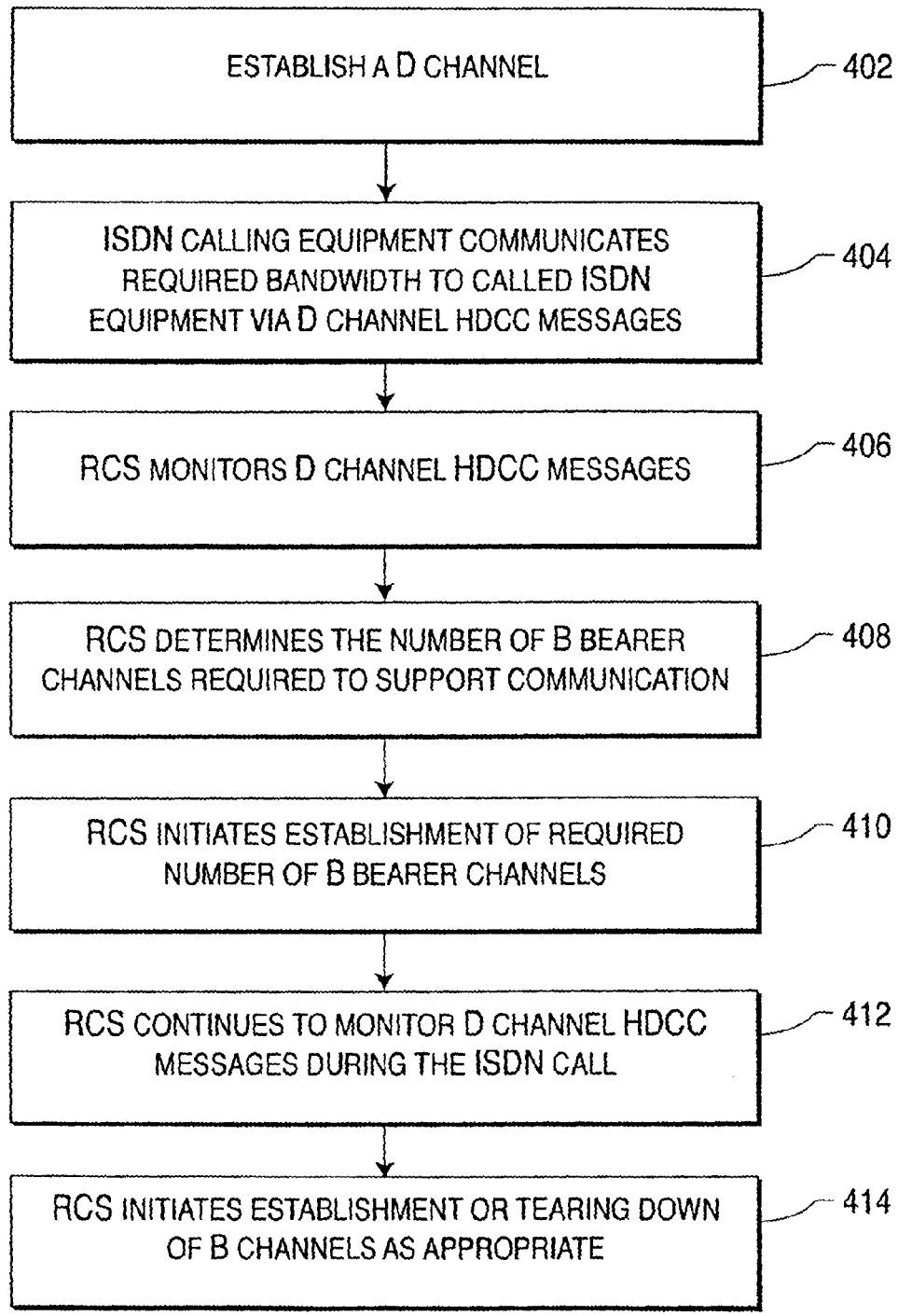
FIG. 5 is a flow diagram of the procedure for dynamic allocation of bandwidth for ISDN service.

The procedure 400 for dynamic allocation of bandwidth for ISDN service in accordance with the present invention will be explained in greater detail with reference to FIG. 5. When an ISDN call is initiated, the D channel is established first (step 402). The bandwidth required for the particular application is communicated from the calling ISDN equipment to the called ISDN equipment through messages on the D channel (step 404). These messages are in HDLC format and the RCS 104 monitors these messages via an HDLC interface (step 406). Once the RCS 104 determines how many B channels are required (step 408) it initiates establishment of these bearer channels over the air interface (step 410). The RCS continues monitoring the HDLC messages on the D channel during the ISDN call (step 412) and determines if additional B channels are to be switched in or out. In case that additional B channels should be switched in or out, the RCS 104 initiates the establishment or tearing down of the bearer channels over the air interface (step 414).

Figure 6A:
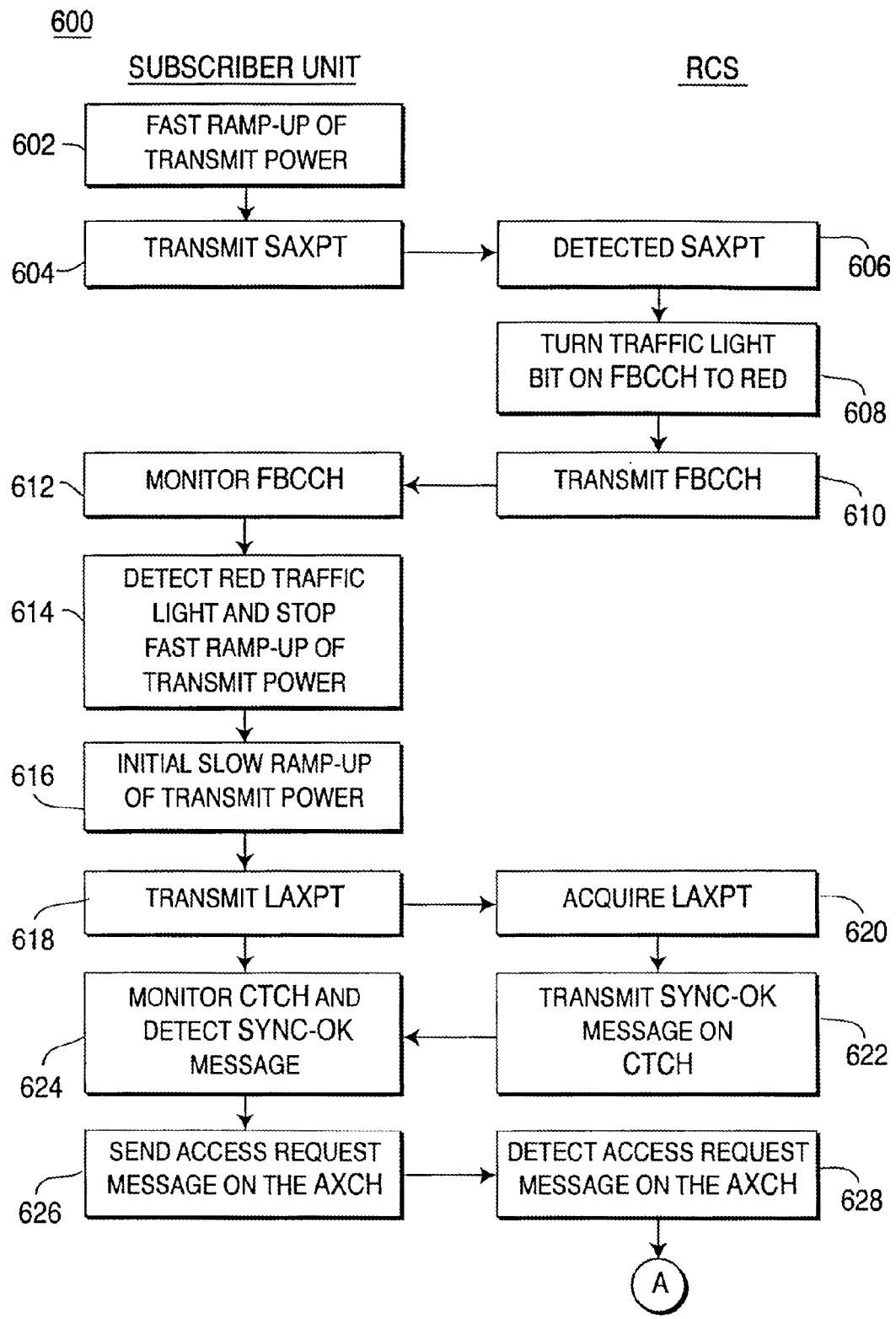
FIGS. 6A and 6B are flow diagrams of the establishment of the bearer channel between the subscriber unit and the RCS for POTS service.
Figure 6B:
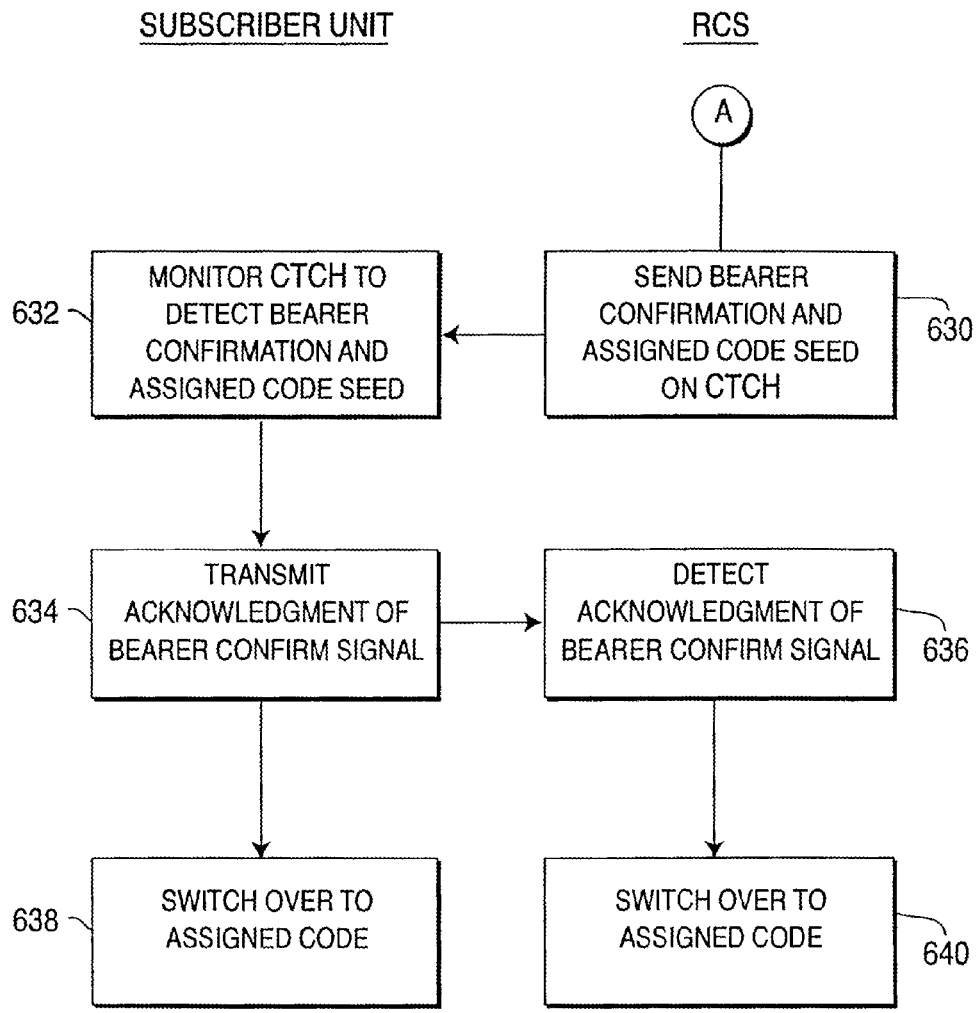

A flow diagram showing simplified procedure 600 of the bearer channel establishment will be described with reference to FIGS. 6A and 6B. The subscriber unit 111 quickly ramps up its transmit power (step 602) while sending the SAXPT (step 604). When the RCS 104 detects the SAXPT (step 606), it turns the traffic light bit to "red" on the FBCCH (step 608) to signal to the subscriber unit 111 that it has been detected. The RCS 104 transmits the FBCCH (step 610). The subscriber unit 111 monitors the FBCCH (step 612) and it stops the fast ramp-up when it sees the "traffic light" turn red on the FBCCH (step 614). The subscriber unit 111 then continues a slow ramp-up of its transmit power (step 616) while transmitting the LAXPT (step 618). When the RCS 104 acquires the LAXPT (step 620), it informs the subscriber unit 111 via the SYNC-OK message on CTCH (step 622). This completes the transmit power ramping up part of the access procedure.

After the subscriber unit 111 receives the SYNC-OK message on the CTCH (step 624), it sends the access request message on the AXCH (step 626). Upon receiving the request (step 628) the RCS 104 confirms receipt of the AXCH message with a message on CTCH (step 630), which includes the assigned code seed. The subscriber unit 111 detects and acknowledges the bearer confirmation message that carries the assigned code seed on the AXCH (steps 632 and 634), which the RCS 104 detects (step 636). The code switchover is now negotiated and subscriber unit 111 and RCS 104 simultaneously switch to using the assigned code (steps 638 and 640). The bearer channel is now established.

Figure 7:
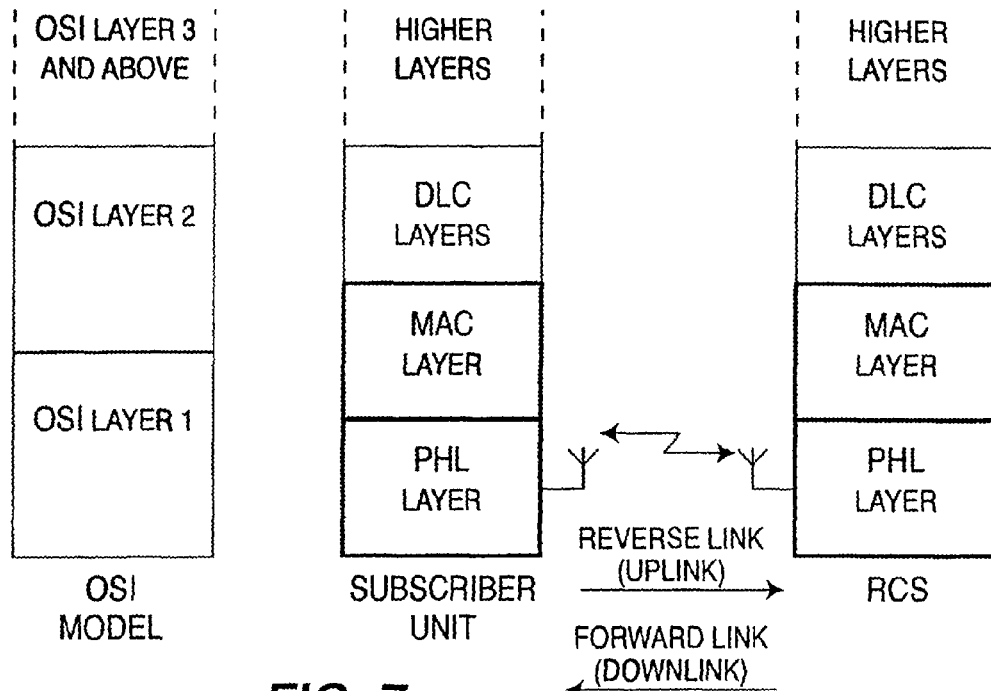
FIG. 7 shows the layered protocol of the communications between the subscriber unit and RCS.

The layered protocol of the communications between the subscriber unit 111 and the RCS 104 is shown in FIG. 7 along with its correspondence to the layers of the Open Systems Interconnection (OSI) reference model. The physical (PHL) layer performs the following functions: 1) generation of CDMA codes; 2) synchronization between transmitter and receiver; 3) providing bearers to the Medium Access Control (MAC) layer; 4) spreading and transmission of bits on a CDMA code specified by the MAC and at a power level specified by the MAC; 5) measurement of received signal strength to allow automatic power control; and 6) generation and transmission of pilot signals. The MAC layers performs the following functions: 1) encoding and decoding for forward error correction (FEC); 2) assignment of CDMA codes; 3) encryption and decryption; 4) providing bearers which are encrypted and error-corrected as appropriate; 5) framing, error checking and discrimination of MAC peer to peer messages and data; 6) link control (DLC) frames; and 7) processing of automatic power control information. The data link control layer (DLC) provides an error-free link between higher level layers of the protocol stack.

Figure 8A:
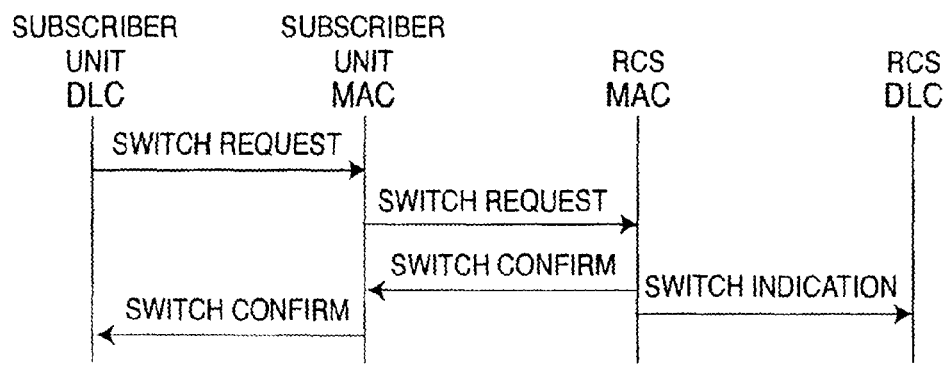
FIG. 8A illustrates the simplified bearer switching method as initiated by the subscriber unit.

As shown in FIG. 8A, the signaling between the subscriber unit 111 and the RCS 104 involves the MAC and DLC layers of the protocol. Once the bearer channel for POTS service is established as described above, the service is available and remains unchanged until it is torn down or unless it has to be modified to support a facsimile transmission or a second call, in the case of a simultaneous OA&M call and POTS call. When there is an OA&M call in progress and the subscriber unit 111 initiates a POTS service call, the procedure as shown in FIG. 8A is entered. This figure illustrates the simplified bearer switching method as initiated by the subscriber unit 111. The messages go between the data link control layer (DLC), medium access control layer (MAC) of the subscriber unit 111, and the corresponding layers in the RCS 104. First, the DLC layer of the subscriber unit 111 initiates a switch request to the MAC layer of the subscriber unit 111, which refers this switch request to the MAC layer of the RCS 104. The RCS 104 sends a confirmation over the MAC layer to the subscriber unit 111 and also sends a switch indication to the DLC layer of the RCS 104. In the subscriber unit 111, the switch confirmation sent from the RCS 104 over the MAC layer is forwarded to the DLC layer of the subscriber unit 111.

Figure 8B:
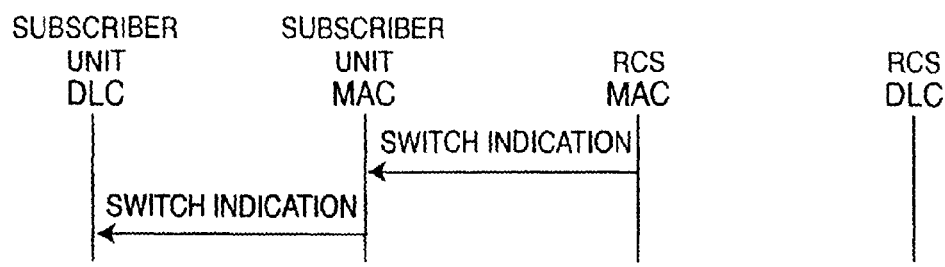
FIG. 8B illustrates the simplified bearer switching method as initiated by the RCS.

When there is a POTS service call in progress and the RCS 104 initiates an OA&M call to the same subscriber unit 111, the procedure as shown in FIG. 8B is entered. This figure illustrates the simplified bearer switching method as initiated by the RCS 104. The RCS 104 initiates a switch indication message over the MAC layer to the subscriber unit 111. The subscriber unit 111 then relays this message via the DLC layer.

Figure 9A:
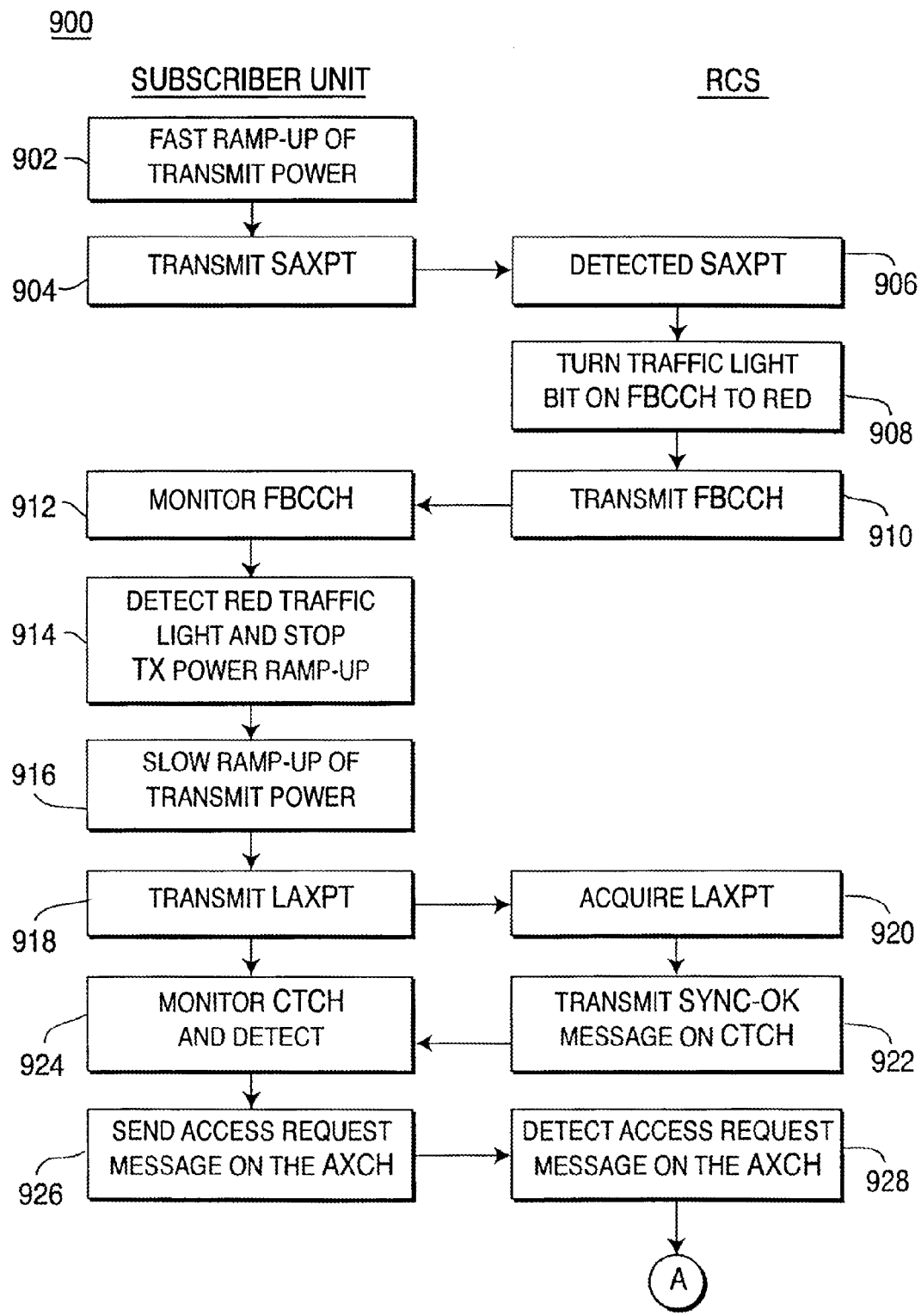
FIGS. 9A and 9B are flow diagrams of the establishment of the bearer channel between the subscriber unit and the RCS for ISDN service.
Figure 9B:
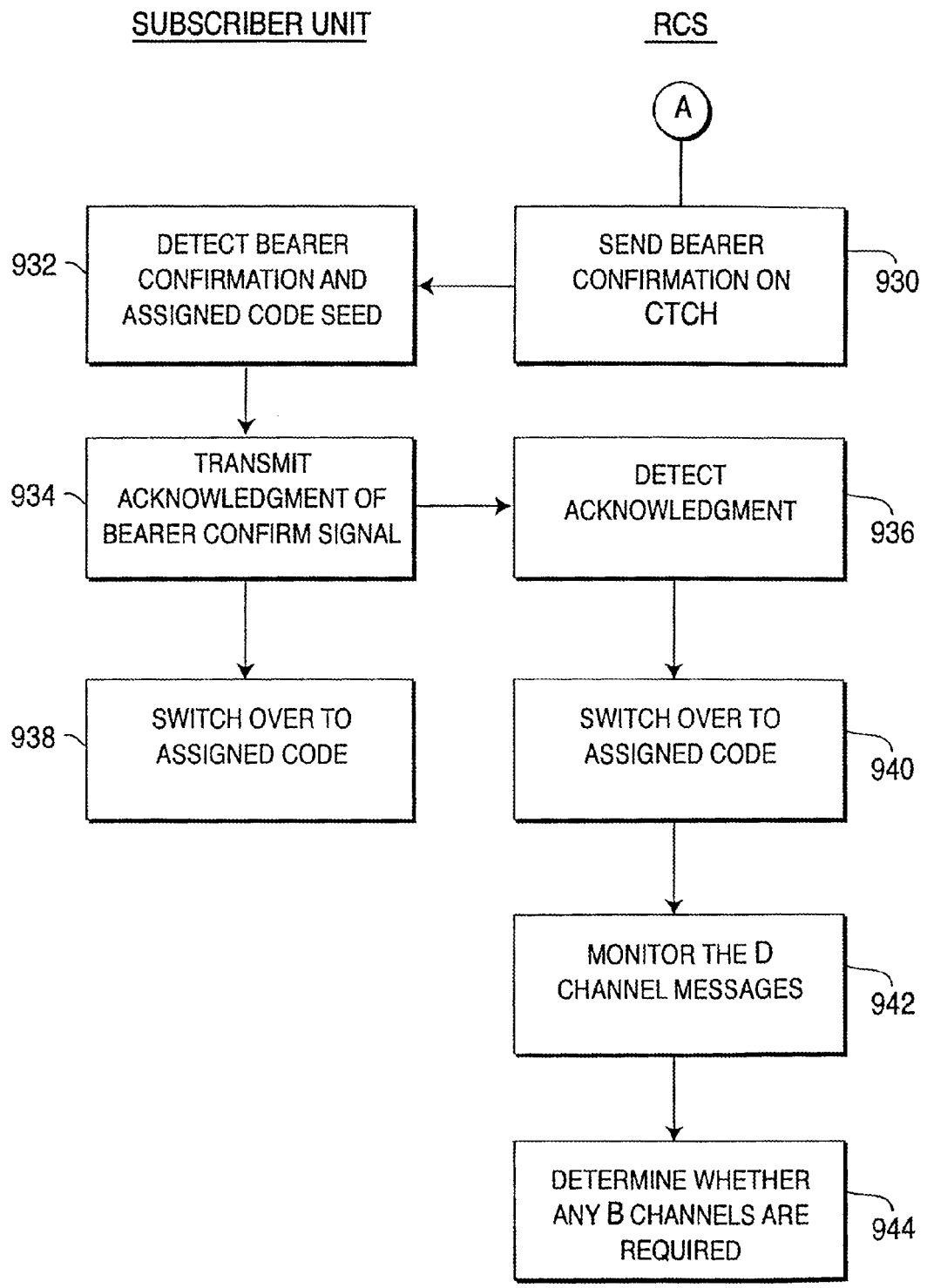

The bearer channel establishment for ISDN will be explained with reference to FIGS. 9A and 9B. Steps 902-940 are the same as the corresponding steps 602-640 in FIGS. 6A and 6B. However, several additional steps are required after the subscriber unit 111 and the RCS 104 both switch to the assigned codes (steps 938 and 940). Once the subscriber unit 111 and RCS 104 switch to assigned codes (steps 938 and 940) the ISDN D channel becomes active. At this point the S/T interface between the subscriber unit 111 and the ISDN equipment is already active. The RCS 104 starts monitoring the D channel messages (step 942), which are in HDLC format. Upon detecting that one or more B channels are needed for the particular application (step 944) the RCS 104 initiates establishment of these bearer channels over the air interface. The process is then continued in accordance with the procedure shown in FIG. 5. The MAC and DLC message flow for this procedure is the same as in FIG. 8B.

The bearer channels for POTS and ISDN is switched in or out via the same message flow. Whether the bearer channel is switched in or out is indicated by appropriate values in corresponding fields of the D channel messages. Therefore the flow diagram in FIG. 8B apply to both dynamic switching in of bearer channels as well as dynamic switching out of bearer channels.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

What is claimed is:

1. A code division multiple access (CDMA) subscriber unit comprising:
   an antenna;
   a circuit coupled to the antenna, the circuit configured to transmit a communication to a base station over a first channel at a first data rate;
   the circuit further configured to determine an adjusted data rate desired for support of the communication; and the circuit further configured to transmit the communication to the base station over a second channel at a second data rate, wherein the first data rate is different than the second data rate;

wherein the circuit is further configured to receive power control information from the base station that is time multiplexed onto a physical channel using control signaling and adjust a power level associated with at least one of the channels in accordance with the power control information.

2. The CDMA subscriber unit of claim 1 wherein the antenna is configured to receive the power control information which is time division multiplexed onto a physical channel with signaling information.

3. The CDMA subscriber unit of claim 1, further comprising a digital signal processor.

4. The CDMA subscriber unit of claim 1, further comprising a CODEC circuit.

5. The CDMA subscriber unit of claim 1, wherein the circuit is further configured to receive two calls simultaneously.

6. A method for use in a code division multiple access (CDMA) subscriber unit, the method comprising:

transmitting a communication to a base station at a first data rate using at least one of communication channel;

determining an adjusted data rate desired for support of the communication;

transmitting the communication to the base station over a second channel at a second data rate, wherein the first data rate is different than the second data rate; and receiving power control information from the base station that is time multiplexed onto a physical channel using control signaling and adjusting a power level associated with at least one of the channels in accordance with the power control information.

7. The method of claim 6 further comprising receiving the power control information which is time division multiplexed onto a physical channel with signaling information.

8. The method of claim 7 further comprising receiving two calls simultaneously.

* * * * *